US009394476B2

(12) United States Patent
Qu et al.

(10) Patent No.: US 9,394,476 B2
(45) Date of Patent: Jul. 19, 2016

(54) WELL TREATMENT METHODS AND FLUIDS (71) Applicant: BAKER HUGHES INCORPORATED, Houston, TX (US)

(72) Inventors: Qi Qu, Spring, TX (US); Leiming Li, Sugar Land, TX (US); Hong Sun, Houston, TX (US); Magnus Legemah, Richmond, TX (US); Jia Zhou, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/187,544

(22) Filed: Feb. 24, 2014

(65) Prior Publication Data

US 2015/0240149 A1 Aug. 27, 2015

(51) Int. Cl.
  *E21B 43/16* (2006.01)
  *E21B 43/25* (2006.01)
  *E21B 43/26* (2006.01)
  *C09K 8/62* (2006.01)
  *C09K 8/70* (2006.01)
  *C09K 8/68* (2006.01)
  *C09K 8/88* (2006.01)

(52) U.S. Cl.
  CPC . *C09K 8/70* (2013.01); *C09K 8/685* (2013.01); *C09K 8/887* (2013.01); *E21B 43/25* (2013.01); *C09K 2208/26* (2013.01)

(58) Field of Classification Search
  CPC ......... E21B 43/16; E21B 43/25; E21B 43/26; C09K 8/62
  See application file for complete search history.

(56) References Cited

U.S. PATENT DOCUMENTS

| 4,428,432 | A | 1/1984 | Pabley |
| 4,552,215 | A | 11/1985 | Almond et al. |
| 4,619,776 | A | 10/1986 | Mondshine |
| 4,649,999 | A | 3/1987 | Sandy et al. |
| 5,067,566 | A | 11/1991 | Dawson |

(Continued)

FOREIGN PATENT DOCUMENTS

WO 2012136747 10/2012

OTHER PUBLICATIONS

Li, et al., "Well Treatment Fluids Prepared with Oilfield Produced Water", SPE 124212, Copyright 2009, Society of Petroleum Engineers.

(Continued)

*Primary Examiner* — Angela M DiTrani
*Assistant Examiner* — Charles R Nold
(74) *Attorney, Agent, or Firm* — Parsons Behle & Latimer (57) ABSTRACT A method includes forming a well treatment fluid by combining an aqueous fluid, a viscosifying agent, a crosslinker, and a rheology modifier containing an aldehyde. The viscosifying agent is crosslinked, increasing viscosity of the fluid. The method includes treating a well with the fluid exhibiting the increased viscosity, chemically changing the aldehyde after the crosslinking and thereby forming an acid, and decreasing viscosity of the crosslinked fluid as a result of forming the acid. The aldehyde may be glyoxal which forms oxalic acid, breaking a crosslink. A well treatment fluid is formulated with ingredients including an aqueous fluid and a viscosifying agent and a crosslinker configured to crosslink the viscosifying agent. The fluid includes a rheology modifier containing an aldehyde. The fluid may lack an aldehyde crosslinking delay additive.

16 Claims, 5 Drawing Sheets

(56) References Cited

U.S. PATENT DOCUMENTS

| | | | |
|---|---|---|---|
| 5,160,643 A | 11/1992 | Dawson | |
| 5,217,632 A * | 6/1993 | Sharif | 507/209 |
| 6,617,285 B2 * | 9/2003 | Crews | 507/201 |
| 7,084,096 B2 * | 8/2006 | Harris et al. | 507/273 |
| 7,888,297 B2 * | 2/2011 | Hanes et al. | 507/269 |
| 7,968,501 B2 * | 6/2011 | Parris | 507/261 |
| 8,590,622 B2 * | 11/2013 | Pauls et al. | 166/308.5 |
| 2003/0236171 A1 | 12/2003 | Nguyen et al. | |
| 2005/0194139 A1 | 9/2005 | Hanes et al. | |
| 2005/0274523 A1 | 12/2005 | Brannon et al. | |
| 2006/0148659 A1 | 7/2006 | Gupta et al. | |
| 2006/0205605 A1 | 9/2006 | Dessinges et al. | |
| 2006/0225884 A1 | 10/2006 | Harris et al. | |
| 2007/0037713 A1 | 2/2007 | Harris et al. | |
| 2007/0289743 A1 | 12/2007 | Willberg et al. | |
| 2008/0039346 A1 | 2/2008 | Welton et al. | |
| 2008/0182762 A1 | 7/2008 | Huang et al. | |
| 2008/0257551 A1 | 10/2008 | Morris | |
| 2008/0287323 A1 | 11/2008 | Li et al. | |
| 2009/0114390 A1 | 5/2009 | You | |
| 2009/0203554 A1 | 8/2009 | Monroe et al. | |
| 2009/0205824 A1 | 8/2009 | Sullivan et al. | |
| 2010/0175877 A1 | 7/2010 | Parris et al. | |
| 2010/0276150 A1 | 11/2010 | Sullivan et al. | |
| 2010/0311621 A1 | 12/2010 | Kesavan et al. | |
| 2013/0228335 A1 | 9/2013 | Dobson et al. | |
| 2014/0158355 A1 * | 6/2014 | Wuthrich | C09K 8/588 166/294 |

OTHER PUBLICATIONS

Li, et al., "Well Treatment Fluids Prepared with Oilfield Produced Water: Part II", SPE 133379, Copyright 2010, Society of Petroleum Engineers.

International Searching Authority; Search Report and Written Opinion for PCT/US2015/015251 dated Apr. 20, 2015.

* cited by examiner

WELL TREATMENT METHODS AND FLUIDS

TECHNICAL FIELD

The methods and compositions herein pertain to well treatment methods and fluids, such as those with a controllable-release rheology modifier, for example, a controllable-release breaker, including a slow-release breaker.

BACKGROUND

Wells drilled in low-permeability subterranean formations are often treated by reservoir stimulation techniques, such as hydraulic fracturing, to increase hydrocarbon production rate. High viscosity fluids may be employed to carry proppant down-hole to prop open fractures in the formation. Known linear gels (water containing a gelling agent only) that can be operated at ambient temperature at the surface generally do not exhibit a sufficiently high viscosity to transfer proppant of a large size or large quantity. Consequently, crosslinkers may be used to increase fluid viscosity, providing adequate transport of larger proppant sizes or larger proppant quantity. Higher viscosity fluids also create wider fractures within the formation.

Guar and guar derivatives are among the most often used viscosifying agents, such as polymers, in hydraulic fracturing treatment. Guar derivatives, such as carboxymethyl guar (CMG) and carboxymethyl hydroxypropyl guar (CMHPG), are predominantly used in wells with a high bottom-hole temperature (BHT). Interest in cellulose derivatives, such as hydroxyethyl cellulose (HEC), carboxymethyl cellulose (CMC), and carboxymethyl hydroxyethyl cellulose (CM-HEC), has increased for fracturing treatment due to the natural abundance of cellulose.

Often, hydraulic fracturing gels include cross-linking delay additives, gel breakers, and fluid loss control additives among many other possible additives to adapt hydraulic fracturing gel to the circumstances of hydraulic fracturing. A variety of gelling agents and cross-linkers are known for use in hydraulic fracturing gel. For a delay additive, cross-linking reactions are so designed that viscosity development begins after placement of hydraulic fracturing gel deep within a well.

In a related manner, rheology modifiers, such as gel breakers, may be included in hydraulic fracturing gel to significantly decrease viscosity after fracturing for easier removal of the gel from the well. To the extent that the cross-linked gel contains a gel breaker, the gel breaker may be configured for delayed action to maintain desirable properties of the cross-linked gel while fracturing. Even so, additional delay chemistries are desired to adapt rheology modifiers to an increased variety of viscosifying agents and related components.

In addition, fluid volumes in fracturing treatments have increased substantially, while public concern for water use and disposal has also increased. Rather than paying to treat and dispose of produced and flowback water, service companies and operators have pursued recycling in subsequent stimulation operations. "Produced water" refers to water generated from hydrocarbon wells. Generally the term is used in the oil industry to describe water that is produced along with oil and/or gas. "Flowback water" is a subcategory of produced water referring to fracturing fluid that flows back through the well, which may account for some fraction of the original fracture fluid volume.

Produced water, especially from shale plays such as Marcellus and Bakken, is known for its high total dissolved solids (TDS) content. TDS pose challenges for known guar- and guar derivative-based fracturing fluids. Further, various well treatment fluids that are originally prepared with clean water may show lower performance or even fail completely if salty and hard produced water is used in place of clean water. Consequently, produced water intended for recycling in subsequent stimulation operations is treated to obtain a water quality suitable for the fracturing fluids. Even so, such treatment is often cost-prohibitive and time-consuming. Accordingly, other fluids suitable for recycling of produced water are desirable.

SUMMARY

A well treatment method includes forming a well treatment fluid by combining ingredients including an aqueous fluid, a viscosifying agent, a crosslinker, and a rheology modifier containing an aldehyde. The viscosifying agent is crosslinked in the aqueous fluid using the crosslinker, the crosslinking increasing viscosity of the well treatment fluid. The method includes treating a well with the well treatment fluid exhibiting the increased viscosity, chemically changing the aldehyde after the crosslinking and thereby forming an acid, and decreasing viscosity of the crosslinked well treatment fluid as a result of forming the acid.

Another well treatment method includes forming a well treatment fluid by combining ingredients including an aqueous fluid, a viscosifying agent, a crosslinker containing zirconium, and a rheology modifier containing glyoxal. The viscosifying agent is crosslinked in the aqueous fluid using the crosslinker, the crosslinking increasing viscosity of the well treatment fluid. The method includes treating a well with the well treatment fluid exhibiting the increased viscosity, chemically changing the glyoxal after the crosslinking and thereby forming oxalic acid, the oxalic acid breaking a crosslink formed by the zirconium, and decreasing viscosity of the crosslinked well treatment fluid using the oxalic acid.

A well treatment fluid is formulated with ingredients including an aqueous fluid and a viscosifying agent and a crosslinker configured to crosslink the viscosifying agent in the aqueous fluid and thereby to increase viscosity of the well treatment fluid. The fluid includes a rheology modifier containing an aldehyde. The well treatment fluid is configured to chemically change the aldehyde after the crosslinking and thereby to form an acid configured to decrease viscosity of the crosslinked well treatment fluid. The well treatment fluid lacks an aldehyde crosslinking delay additive.

BRIEF DESCRIPTION OF THE DRAWINGS

Some embodiments are described below with reference to the following accompanying drawings.

DETAILED DESCRIPTION

A rheology modifier, such as a crosslinked gel breaker, may be based on an aldehyde, including a dialdehyde, for example glyoxal. The aldehyde may release an acid slowly and controllably into a well treatment fluid, such as a crosslinked gel, and decrease viscosity of the gel over a sufficient time to complete use of the well treatment fluid before substantial viscosity loss. Without being limited to any particular theory, the dialdehyde might provide the benefit over monoaldehyde of forming a di-acid, such as oxalic acid, capable of chelating crosslinkers to break crosslinks. The rheology modifier may be an aqueous solution of the aldehyde.

Accordingly, a well treatment method includes forming a well treatment fluid by combining ingredients including an aqueous fluid, a viscosifying agent, a crosslinker, and a rheology modifier containing an aldehyde. The viscosifying agent in the aqueous fluid is crosslinked using the crosslinker, the crosslinking increasing viscosity of the well treatment fluid. The method includes treating a well with the well treatment fluid exhibiting the increased viscosity and chemically changing the aldehyde after the crosslinking, thereby forming an acid. Viscosity of the crosslinked well treatment fluid is decreased using the acid.

Features of the various methods and compositions described herein may also be included in the above method as consistent and appropriate. By way of example, the well treatment fluid may lack an aldehyde crosslinking delay additive. That is, glyoxal is known for use in gels as a crosslinking delay additive (see, U.S. Pat. No. 5,160,643 issued to Dawson). Nevertheless, the well treatment fluids herein may lack a crosslinking delay additive or the well treatment fluid may include a crosslinking delay additive different from the aldehyde functioning herein as a viscosity breaker. In other words, the aldehyde rheology modifier herein need not delay the crosslinking.

Also, the aldehyde might not substantially chemically change before the crosslinking. Even so, some insubstantial or de minimis chemical change to the aldehyde may occur before the crosslinking. Depending on the aldehyde used, formulation of the well treatment fluid, or both, lack of a pH decrease or lack of a viscosity decrease before the crosslinking could be evidence of no or only insubstantial chemical change to the aldehyde.

Chemically changing the aldehyde to an acid, as in the case of glyoxal forming oxalic acid, may involve one or more reaction mechanisms not completely defined in the literature. Even so, one or more chemical reactions are believed to occur in the change, one of which may be oxidation of the aldehyde or of an intermediate component to form acid. Chemically changing the glyoxal may instead or additionally yield other acid(s) and/or other chemical(s) involved in decreasing viscosity of the crosslinked well treatment fluid.

Likewise, decreasing viscosity of the crosslinked well treatment fluid as a result of forming the acid may involve one or more incompletely defined effects. One possible effect includes damage to the viscosifying agent, such as polymer, due a pH decrease upon generation of the acid. Another possible effect includes the acid directly interacting with and breaking the crosslinks. The two described effects and other viscosity decreases as a result of forming the acid may function in combination.

The viscosifying agent may contain a polymer and the crosslinker may contain a metal cation or borate. The method may further include breaking a crosslink formed by the metal cation or borate to effect the viscosity decrease. Breaking the crosslink may include chelating the metal cation with the acid. The metal cation may be a zirconium or titanium ion. It follows that decreasing viscosity may occur by a stepwise process, namely, chemically changing the aldehyde, forming the acid, and the acid breaking the crosslink formed by the metal cation or borate. The stepwise process may also include the acid competing for chelation of the metal cation to break the crosslink. It is conceivable that decreasing viscosity may occur by a different process that does not break the crosslink.

Compared to the well treatment fluid without the rheology modifier, viscosity may decrease at a faster rate. The numerical value for the decrease in viscosity and the time over which it occurs varies depending on the application. Consequently, the rate of decrease also varies. In field operations, the fluid viscosity can be very high (as in in gel plugs), just several hundred centiPoise (as in frac fluids), or just a few centiPoise (as in slickwater). It will be appreciated that the larger viscosity decreases may occur in the higher viscosity fluids. Also, fluids may be formulated to break in 2 days, or to break in 2 hours. Even so, for the methods and compositions herein, the viscosity may decrease at a faster rate compared to known fluids and compared to the well treatment fluid herein without the rheology modifier.

The aldehyde selected may be glyoxal and the acid may be oxalic acid. The intermediate products in the chemical change of glyoxal to oxalic acid, may be present, but likely not participating appreciably in breaking metal cation crosslinking. The well treatment fluid ingredients may contain up to 10 weight % (wt %) rheology modifier, such as up to 5 wt %, including up to 1 wt %, for example, from about 0.01 wt % to about 0.5 wt %. The rheology modifier may be an aqueous solution of the aldehyde, such as a 40 wt % solution. The well treatment fluid may contain additional components known for suitability in a selected fluid application, such as hydraulic fracturing. Examples include gel stabilizer, buffer, etc. The gel stabilizer may include sodium thiosulfate, thiosulfate, alkoxylated sorbitol, sorbitol, methanol, formate, and combinations thereof. The buffer may include sodium bicarbonate, bicarbonate, carbonate, hydroxide, acetate, formate, zirconium hydroxide, zirconium carbonate, and combinations thereof. The well treatment fluid may also contain diol, such as ethylene glycol.

Treating the well with the well treatment fluid may include hydraulic fracturing, gravel packing, sand control, or other known applications for crosslinked well treatment fluid. The aqueous fluid may beneficially include produced water, allowing recycling of produced water from a well treatment method, as described in the Background section above.

The ingredients may further include a zirconium salt, described further below, which may increase viscosity of the fluid prior to breaking, even being useful to such effect when the aqueous fluid is produced water. The zirconium salt may be selected from the group consisting of zirconium hydroxide, zirconium carbonate, zirconium dioxide, and combinations thereof. The well treatment fluid ingredients may contain up to 20 wt % zirconium salt, such as up to 5 wt %, for example, from about 0.01 wt % to about 2 wt %.

Latent acids, such as esters and polylactic acid, are known for use as slow-release breakers. Glyoxal chemically changes to oxalic acid at increasing rates for increased temperature and increased pH. Accordingly, release rate may be controlled in the environment of a well treatment fluid, such as a hydraulic fracturing gel. Other dialdehydes may exhibit similar properties.

Another well treatment method includes forming a well treatment fluid by combining ingredients including an aqueous fluid, a viscosifying agent, a crosslinker containing zirconium, and a rheology modifier containing glyoxal. The viscosifying agent is crosslinked in the aqueous fluid using the crosslinker, the crosslinking increasing viscosity of the well treatment fluid. The method includes treating a well with the well treatment fluid exhibiting the increased viscosity, chemically changing the glyoxal after the crosslinking, thereby forming oxalic acid, and the oxalic acid breaking a crosslink formed by the zirconium. Viscosity of the crosslinked well treatment fluid is decreased using the oxalic acid.

Features of the various methods and compositions described herein may also be included in the above method as consistent and appropriate. By way of example, the well treatment fluid may lack a glyoxal crosslinking delay additive. Breaking the crosslink may include chelating the zirconium with the oxalic acid. Breaking the crosslink may instead or additionally include the oxalic acid decreasing pH.

The viscosity may decrease at a faster rate compared to the well treatment fluid without the rheology modifier. The aqueous fluid may be produced water and the ingredients may further include a zirconium salt selected from the group consisting of zirconium hydroxide, zirconium carbonate, zirconium dioxide, and combinations thereof.

As will be appreciated from the methods herein, a well treatment fluid may be described as formulated with ingredients including an aqueous fluid, a viscosifying agent, a crosslinker, and a rheology modifier containing an aldehyde. The viscosifying agent and crosslinker are configured to crosslink the viscosifying agent in the aqueous fluid and thereby to increase viscosity of the well treatment fluid. The well treatment fluid is configured to chemically change the aldehyde after the crosslinking and thereby to form an acid configured to decrease viscosity of the crosslinked well treatment fluid. The well treatment fluid lacks an aldehyde crosslinking delay additive.

Features of the various methods and compositions described herein may also be included in the above method as consistent and appropriate. By way of example, the crosslinker may contain a metal cation or borate, the acid being configured to break a crosslink formed by the metal cation or borate. The acid may further be configured to chelate the metal cation to break the crosslink. The acid may instead or additionally be configured to decrease pH to break the crosslink. The aldehyde may be glyoxal and the acid may be oxalic acid. The aqueous fluid may be produced water and the ingredients may further comprise a zirconium salt. The zirconium salt may be selected from the group consisting of zirconium hydroxide, zirconium carbonate, zirconium dioxide, and combinations thereof.

As introduced above, Zr salt may be beneficially used in a well treatment fluid. Zr salt exhibits known properties as a metal denaturant and/or bactericide in well treatment fluids susceptible to enzymatic or bacterial degradation of gelling agents, such as polymers (see, U.S. Pat. Pub. No. 2008/0287323 by Li et al.). Alternative uses of Zr salt are described herein.

A discussion of temperature stability for gelling agents affected by bottom hole temperature is introduced in the Background section above. Acid hydrolysis of polymer often increases with increasing temperature, resulting in a pH decrease in well treatment fluids with increasing placement depth. Zr salt, such as $Zr(OH)_4$, may dissolve more readily as pH decreases in a well treatment fluid at depth. Accordingly, the presence of Zr salt may operate to stabilize fluid pH as Zr salt disassociates into Zr(IV) and hydroxide ions, or other components, counteracting a pH decrease. The stabilized pH then also increases viscosity stability, reducing acid hydrolysis.

The Zr salt additionally increases viscosity stability since the Zr(IV) ions may also contribute to crosslinking of the viscosifying agent. In a system susceptible to Zr crosslinking, Zr salt may thus serve a dual function.

Beneficially, even though well treatment fluids using produced water may be difficult to crosslink, observation indicates that Zr-based crosslinking systems may be compatible with use of produced water. Increasing hardness in produced water decreases suitability of using produced water, so hardness damage may be mitigated by keeping pH below about 9, such as below about 8, for example below about 7, including between about 6 and about 5, at least during crosslinking.

Incorporating a buffer to clamp the pH at about 5.0 to 6.0 in a well treatment fluid containing Zr salt may provide a system compatible with otherwise unsuitable levels of TDS and hardness from produced water. For treatment fluids including produced water, the pH may control hardness, the Zr salt may control pH, and the Zr salt may also maintain crosslinking.

Therefore, a further well treatment method includes forming a well treatment fluid by combining ingredients including produced water, a viscosifying agent, a crosslinker containing a metal cation, a rheology modifier containing an aldehyde, and a zirconium salt. The produced water contains more than 1,000 ppm total dissolved solids. The method includes dissolving at least a portion of the zirconium salt in the well treatment fluid and stabilizing pH of the well treatment fluid with the zirconium salt. The viscosifying agent is crosslinked in the aqueous fluid using the crosslinker and the dissolved zirconium from the zirconium salt, the crosslinking increasing viscosity of the well treatment fluid compared to the well treatment fluid without the zirconium salt. A well is treated with the well treatment fluid exhibiting the increased viscosity.

The aldehyde is chemically changed after the crosslinking, thereby forming an acid. The method includes decreasing pH and chelating the metal cation and the dissolved zirconium with the acid, thus breaking the crosslinked well treatment fluid. Using the acid, viscosity of the crosslinked well treatment fluid is decreased compared to the crosslinked well treatment fluid without the rheology modifier.

Features of the various methods and compositions described herein may also be included in the above method as consistent and appropriate. By way of example, TDS may be more than 10,000 ppm, such as more than 100,000 ppm, including more than 300,000 ppm. Hardness measured as $CaCO_3$ equivalent may be more than 20,000 ppm, such as more than 40,000 ppm, including more than 60,000 ppm. The aldehyde may be glyoxal and the acid may be oxalic acid. The zirconium salt may be selected from the group consisting of zirconium hydroxide, zirconium carbonate, zirconium dioxide, and combinations thereof.

It is conceivable that pH may be controlled to facilitate different portions of the method. For example, pH may be maintained below about 7 during crosslinking and use of the crosslinked well treatment fluid.

In another well treatment fluid system, observation indicated that decreasing pH may decrease pre-crosslinked polyacrylamide gel viscosity. The gel contained spheres of crosslinked polyacrylamide. Near neutral pH, the polyacrylamide chains anchored on these spheres are believed to stretch and touch each other, giving viscosity to the gel through physical entanglement. At lowered pH, the polyacrylamide chains are believed to shrink back to the spheres, reducing the contact with each other and decreasing the gel viscosity. The rheology modifier herein as slow release breaker may be used to control the fluid pH which, in turn, controls the fluid viscosity.

The methods and fluids described herein may be further understood from the examples below.

SUMMARY OF EXAMPLES

Example 1: Borate-crosslinked guar fluid prepared with 0.4 gpt slow-release breaker. See FIG. 1 and Table 1.

Example 2: Borate-crosslinked guar fluid prepared with 2 gpt slow-release breaker. See FIG. 2 and Table 1.

Example 3: Borate-crosslinked guar fluid prepared with 0.8 gpt slow-release breaker. See FIG. 3 and Table 1.

Example 4: Zr-crosslinked HEC fluid prepared with slow-release breaker. See FIG. 4.

Example 5: Zr-crosslinked HEC fluid prepared with slow-release breaker and oxidative breaker. See FIG. 5.

Example 6: Zr-crosslinked HPG fluid prepared with produced water. See FIG. 6 and Table 4.

Example 7: Zr-crosslinked HPG fluid prepared with produced water and varying gel pH. See FIG. 7 and Table 4.

Example 8: Zr-crosslinked HPG fluid prepared with produced water and zirconium salt. See FIG. 8 and Table 4.

Example 9: Zr-crosslinked HPG fluid prepared with produced water and methanol. See FIG. 9 and Table 4.

Example 10: Zr-crosslinked CMHEC fluid prepared with produced water. See FIG. 10 and Table 4.

Example 1

Borate-Crosslinked Guar Fluid Prepared with Slow-Release Breaker

Figure 1:
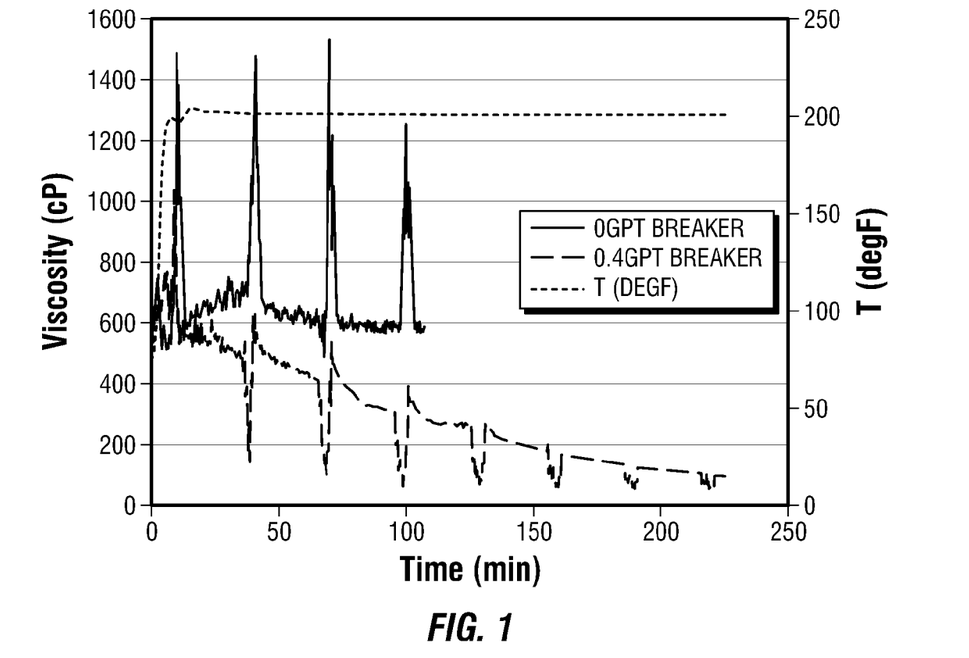
FIGS. 1-5 are charts of viscosity over time for crosslinked fluids prepared with rheology modifiers respective to Examples 1-5.

The slow release breaker used included glyoxal (40 weight % glyoxal solution in water) buffered with pH buffer B to a pH of about 7.1-7.2. When 0.52 mL pH buffer B was added to 60 mL glyoxal solution, the resulting pH at room temperature (RT) was about 7.14-7.16. A borate-crosslinked guar baseline fluid (no breaker or 0 gpt breaker used) was prepared with tap water, 30 ppt (pounds per thousand gallons) guar, 1 gpt (gallon per thousand gallons) clay control agent, and 2 gpt borate crosslinker A. The viscosity at 200° F. was tested with a Chandler 5550 viscometer, following the API RP 39 schedule (American Petroleum Institute Recommended Procedure). The viscosity is shown in FIG. 1. The baseline viscosity stayed at about 600 cPs.

In another test, 0.4 gpt of the breaker was added to the center of the baseline gel in the viscometer, and the viscosity at 200° F. was similarly measured and shown in FIG. 1. The viscosity dropped gradually from about 600 cPs to about 100 cPs in about 4 hours.

Example 2

Borate-Crosslinked Guar Fluid Prepared with Slow-Release Breaker

Figure 2:
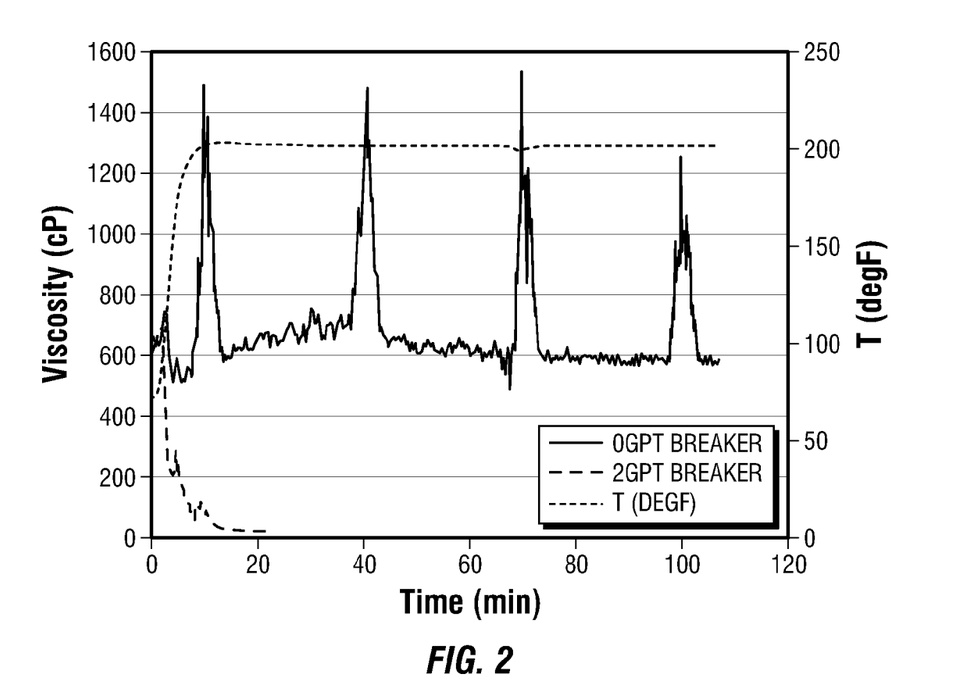

When the dose of the breaker increased to, for example, 2 gpt, the breaking action was much faster. In FIG. 2, the viscosity of the same baseline fluid and the fluid with 2 gpt breaker is shown. The viscosity of the fluid with 2 gpt breaker quickly dropped to below 100 cPs.

Example 3

Borate-Crosslinked Guar Fluid Prepared with Slow-Release Breaker

Figure 3:
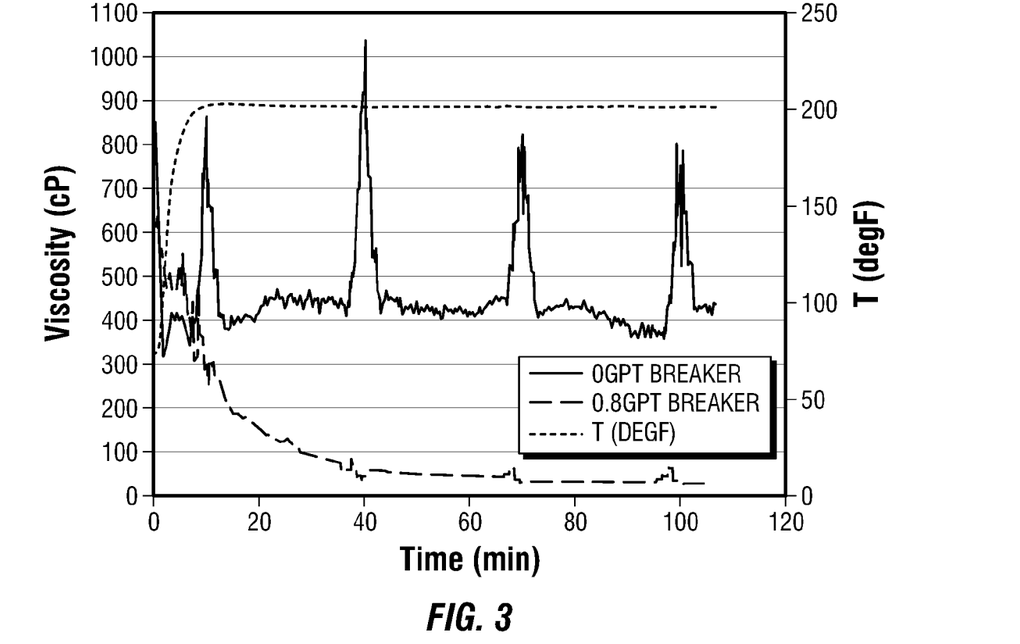

Another borate crosslinked guar baseline fluid (no breaker or 0 gpt breaker used) was prepared with tap water, 25 ppt guar, 1 gpt clay control agent, 1.5 gpt pH buffer E, and 0.75 gpt borate crosslinker B. The viscosity at 200° F. was tested with a Chandler 5550 viscometer, following the API RP 39 schedule. The viscosity is shown in FIG. 3. The baseline viscosity stayed at about 400 cPs. In another test, 0.8 gpt breaker was added to the center of the baseline gel in the viscometer, and the viscosity at 200° F. was similarly measured and is shown in FIG. 3. The viscosity dropped gradually and in a controllable way.

TABLE 1

| Glyoxal Breaker Examples | | | |
|---|---|---|---|
|  | Ex. 1 | Ex. 2 | Ex. 3 |
| guar | 30 ppt | 30 ppt | 25 ppt |
| clay control agent | 1 gpt | 1 gpt | 1 gpt |
| pH buffer E | — | — | 1.5 gpt |
| borate crosslinker A | 2 gpt | 2 gpt | — |
| borate crosslinker B | — | — | 0.75 gpt |
| breaker | 0-0.4 gpt | 0-2 gpt | 0-0.8 gpt |

Example 4

Zr-Crosslinked HEC Fluid Prepared with Slow-Release Breaker

HEC solution was crosslinked with zirconium crosslinkers to form a gel at pH above about 9-10. When adding the breaker to the crosslinked HEC gel, the crosslinking was gradually reversed, causing the gel viscosity to drop gradually.

The metal-crosslinked HEC fluid without the glyoxal solution was prepared first as the baseline gel. To prepare the fluid, 500 ml of tap water with 2% potassium chloride (KCl) was added to a 1-liter Waring blender. While blending, 80 ppt (could be more based on the operational needs) of HEC powder was added to the blender, and hydrated for about 20 minutes. After the hydration, appropriate amounts of additives including the crosslinking delay agent, gel stabilizer such as sodium thiosulfate, and buffer such as sodium hydroxide, etc., could be added into the fluid and allowed to be evenly mixed and dispersed. The metal crosslinker such as the zirconate crosslinker was then added.

The gel thus prepared had a pH of about 12 to 13 at room temperature. The vortex did not appear to close at room temperature even after 10 minutes. The crosslinking delay in the HEC fluid was temperature delay-based. The crosslink in the HEC fluid was activated by heating the fluid above a certain temperature. This intentional crosslinking delay decreases friction pressure and thus the pumping power to deliver the HEC fluid downhole. The viscosity of the baseline HEC gel at 200° F. was measured with the Fann50-type viscometer. The viscosity curve is recorded in FIG. 4. The viscosity of the baseline gel at 200° F. slowly decreased from about 550 cPs in the beginning to about 350 cPs at 350 minutes.

Figure 4:
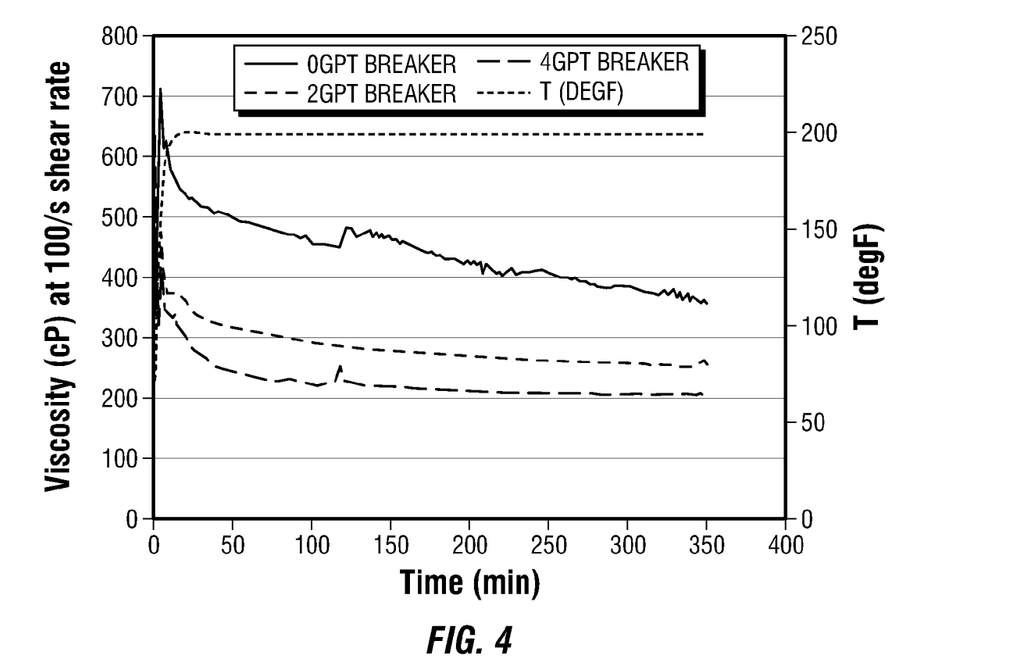

The breaking tests were carried out at 200° F. to assess the breaking performance of the glyoxal solution (the breaker) in the metal-crosslinked HEC fluids. The crosslinked HEC fluid with the glyoxal solution was similarly prepared. The glyoxal solution was added immediately before the crosslinker. In one test, 2 gpt of the glyoxal solution was used. The viscosity of the resulting gel at 200° F. was similarly measured with the viscometer. As shown in FIG. 4, at 200° F. the viscosity of the gel with 2 gpt of the glyoxal solution gradually decreased to about 250 cPs after 350 minutes. In another test, 4 gpt of the glyoxal solution was used in the same HEC gel. As shown in FIG. 4, at the higher glyoxal solution dose of 4 gpt and at 200° F., the viscosity gradually decreased to about 200 cPs after 350 minutes.

Example 5

Figure 5:
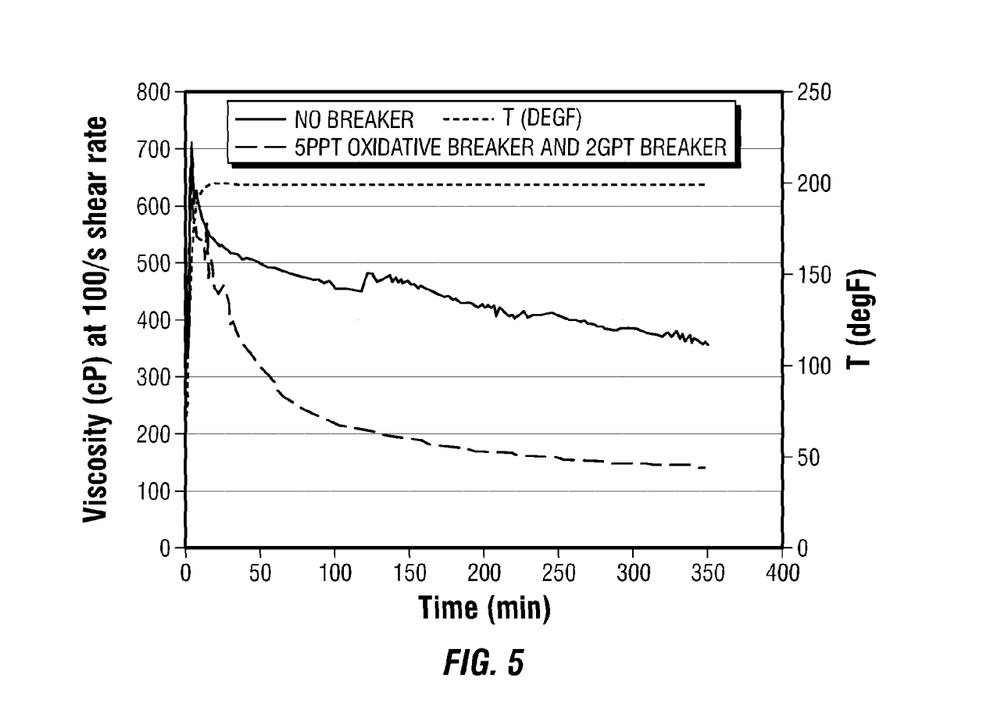

Zr-Crosslinked HEC Fluid Prepared with Slow-Release Breaker and Oxidative Breaker The glyoxal solution (the breaker) performance was also assessed in conjunction with regular oxidative breakers. The baseline HEC gel in FIG. 5 was the same as that in FIG. 4. The viscosity of the baseline gel at 200° F. slowly decreased from about 550 cPs in the beginning to about 350 cPs at 350 minutes. In the breaking test, 2 gpt of the glyoxal solution and 5 ppt of an oxidative breaker (magnesium peroxide) were added together to the similar HEC gel before adding the crosslinker. The viscosity of the resulting gel at 200° F. was similarly measured with the viscometer, as shown in FIG. 5. The viscosity at 200° F. of the HEC gel with both the oxidative breaker and the glyoxal solution gradually decreased from about 550 cPs in the beginning to about 140 cPs after 350 minutes.

Example 6

Zr-Crosslinked HPG Fluid Prepared with Produced Water

Produced water #1 was used in this example. Produced water #1 was offered by an oilfield operator from the field. The water had a pH of about 5.6 at RT. The water analysis of produced water #1 is listed in Table 2. The water had a TDS of over 280,000 mg/L, and hardness of over 46,000 mg/L.

TABLE 2

| Analyte | mg/L |
|---|---|
| Al | 0.14 |
| B | 280 |
| Ba | 17.7 |
| Ca | 16100 |
| Fe | 75.2 |
| K | 4960 |
| Mg | 1220 |
| Mn | 9.54 |
| Na | 91600 |
| $SO_4$ | 403 |
| Si | 14.5 |
| Sr | 1170 |
| Zn | 3.56 |
| Cl | 172000 |
| $HCO_3$ | 128 |
| OH | 0 |
| $CO_3$ | 0 |

Figure 6:
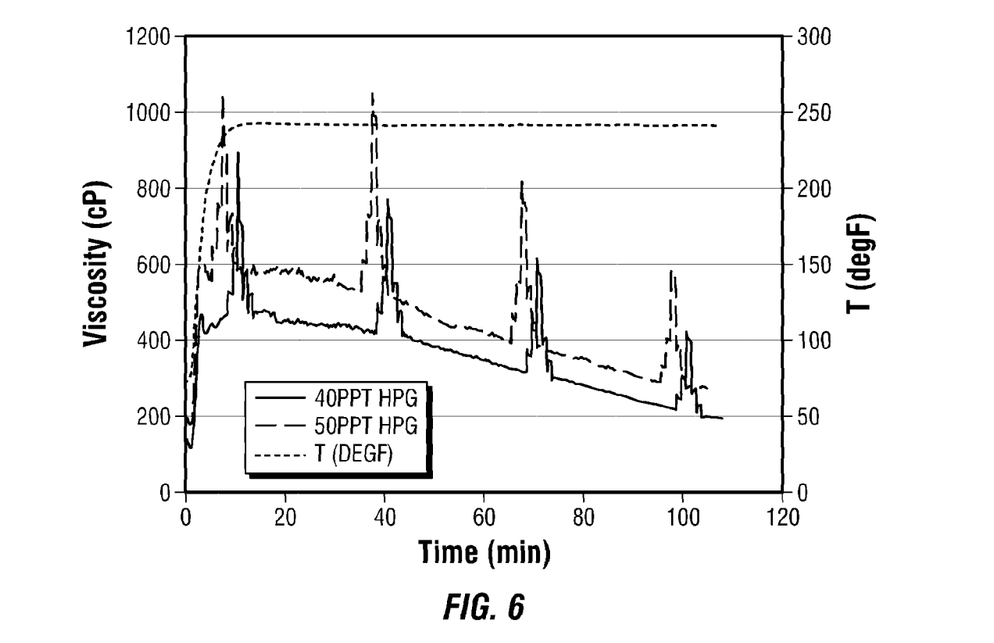
FIGS. 6-10 are charts of viscosity over time for crosslinked fluids prepared with produced water respective to Examples 6-10.

To prepare the fluid, about 250 mL of produced water #1 was placed in a 1 L Waring blender. The mixing speed was adjusted so that the blade nut was just exposed. 40 ppt HPG powder was added to the blender while blending. The blending duration was usually over 10 minutes. After the hydration of the HPG polymer, 2 ppt buffer D, 6 gpt gel stabilizer A, and 1.6 gpt gel stabilizer B were added while blending. Finally, 1.6 gpt zirconium crosslinker was added as the crosslinker. The gel thus formed had a pH of about 5.7 at RT. The viscosity at 240° F. was tested with a Chandler 5550 viscometer, following the API RP 39 schedule. The viscosity is shown in FIG. 6. The fluid showed a decent viscosity, over 400 cPs right before the second ramp peak.

Another fluid was similarly prepared and tested. 50 ppt HPG powder was added to produced water #1 in the blender while blending. After the hydration of the HPG polymer, 2 ppt buffer D, 6 gpt gel stabilizer A, and 2 gpt gel stabilizer B were added while blending. 2 gpt zirconium crosslinker was then added as the crosslinker. The gel thus formed had a pH of about 5.7 at RT. The viscosity at 240° F. was similarly tested and shown in FIG. 6. The fluid showed a decent viscosity, over 500 cPs right before the second ramp peak.

Example 7

Zr-Crosslinked HPG Fluid Prepared with Produced Water and Varying Gel pH

Two Zr-crosslinked HPG fluids were prepared with produced water #1. The influence of the gel pH was observed. To prepare the first fluid, about 250 mL of produced water #1 was placed in the Waring blender. 50 ppt HPG powder was added to the blender while blending. Some pH buffer C was applied during the hydration. After the hydration of the HPG polymer, 6 gpt gel stabilizer A and 2 gpt gel stabilizer B were added while blending. 2 gpt zirconium crosslinker was then added as the crosslinker. The gel thus formed had a pH of about 5.2 at RT. The viscosity at 240° F. was tested with the Chandler 5550 viscometer and is shown in FIG. 7.

To prepare the other fluid, 50 ppt HPG powder was added to produced water #1 in the blender while blending. After the hydration of the HPG polymer, 2 ppt buffer D, 6 gpt gel stabilizer A, and 2 gpt gel stabilizer B were added while blending. 2 gpt zirconium crosslinker was then added as the crosslinker. The gel thus formed had a pH of about 5.7 at RT. The viscosity at 240° F. was similarly tested and is shown in FIG. 7.

Figure 7:
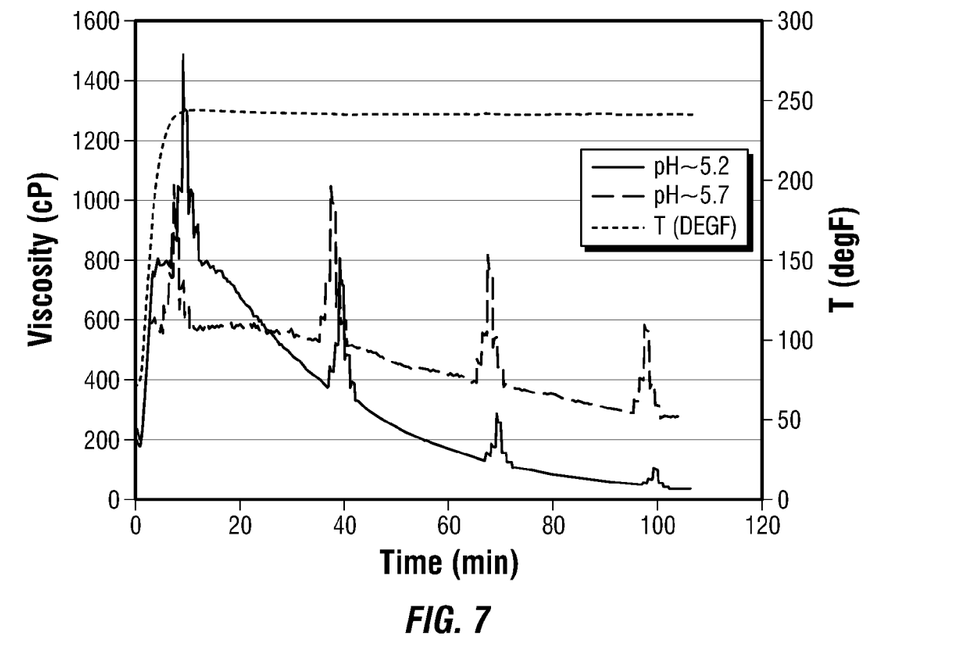

The fluid with the slightly higher pH at 5.7 showed a more stable viscosity profile at 240° F., for example, beyond about 25 minutes, as shown in FIG. 7. The fluid with the lower pH at 5.2 had a larger starting viscosity, which may or may not be desirable in operations, but its viscosity dropped more quickly over time (lower pH might have caused more damage to the fluid at high temperature) than the fluid with the pH at 5.7. The example shows that, by selecting appropriate fluid pH, the fluid could have increased long-term stability.

Example 8

Zr-Crosslinked HPG Fluid Prepared with Produced Water and Zirconium Salt

To prepare the base fluid, about 250 mL of produced water #1 was placed in the Waring blender. 50 ppt HPG powder was added to the blender while blending. Some pH buffer C was applied during the hydration. After the hydration of the HPG polymer, 6 gpt gel stabilizer A and 2 gpt gel stabilizer B were added while blending. 2 gpt zirconium crosslinker was then added as the crosslinker. The gel thus formed had a pH of about 5.2 at RT. The viscosity at 240° F. was tested with the Chandler 5550 viscometer and is shown in FIG. 8.

Figure 8:
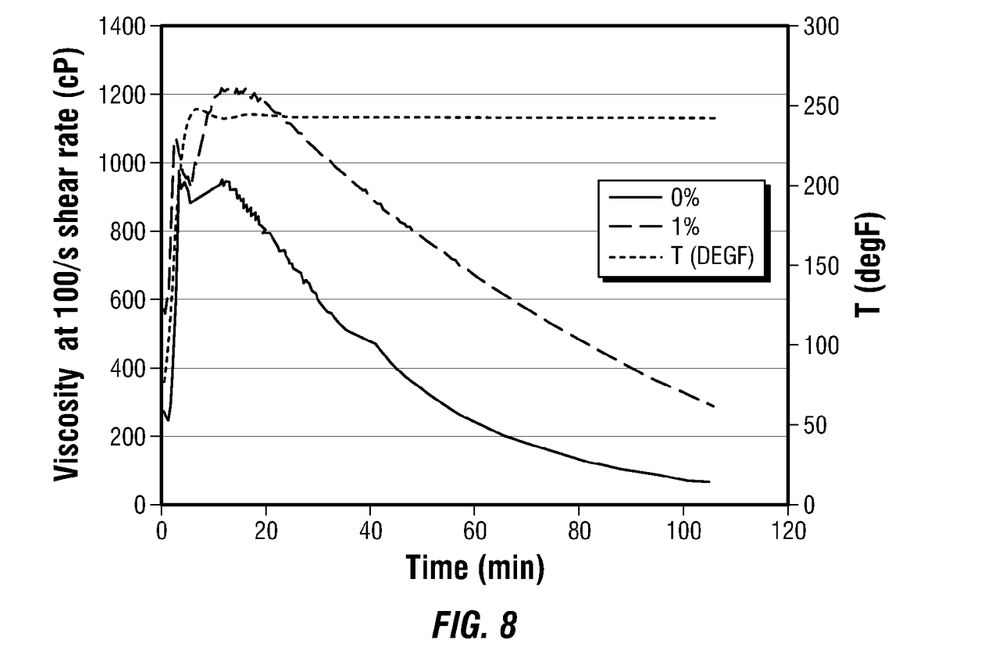

About 1% by weight zirconium (IV) hydroxide fine powder was evenly mixed into the above base gel, and the viscosity at 240° F. was similarly tested and shown in FIG. 8. The fluid with 1% zirconium hydroxide showed significantly enhanced viscosity. For example, at 60 minutes, the viscosity of the fluid with 1% zirconium hydroxide was about 2.7 times that of the base fluid.

Other zirconium salts may also be used, such as zirconium carbonate or zirconium dioxide.

Example 9

Zr-Crosslinked HPG Fluid Prepared with Produced Water and Methanol

Figure 9:
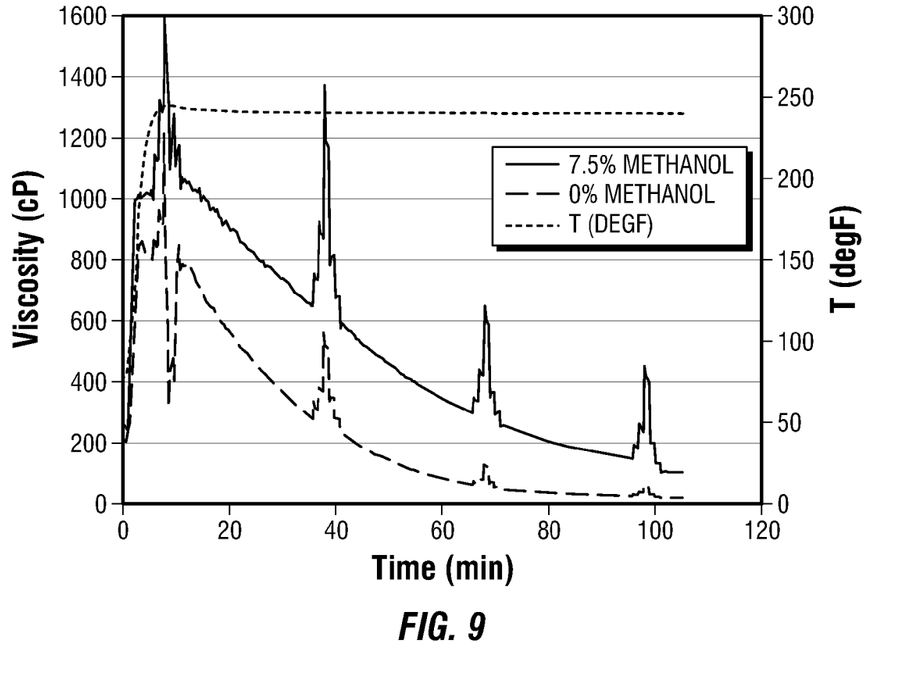

To prepare the base fluid, about 250 mL of produced water #1 was placed in the Waring blender. 50 ppt HPG powder was added to the blender while blending. Some pH buffer C was applied during the hydration. After the hydration of the HPG polymer, 3 gpt gel stabilizer A and 2 gpt gel stabilizer B were added while blending. 2 gpt zirconium crosslinker was then added as the crosslinker. The gel thus formed had a pH of about 5.3 at RT. The viscosity at 240° F. was tested with the Chandler 5550 viscometer and is shown in FIG. 9.

To test the function of methanol, 7.5% by volume methanol was added to the HPG fluid right after hydration. Other additives were similarly added thereafter. The viscosity at 240° F. was tested similarly and is shown in FIG. 9. As shown in FIG. 9, methanol volume percentages at 7.5% significantly enhanced the fluid viscosity at 240° F. It is expected that use of methanol to increase viscosity will be compatible with the methods and compositions described herein that use zirconium salt also to increase viscosity.

Example 10

Zr-Crosslinked CMHEC Fluid Prepared with Produced Water

Produced water #2 was used in this example. Produced water #2 was offered by another oilfield operator from the field. The water had a pH of about 5.6 at RT. The water analysis of produced water #2 is listed in Table 3. The water had a TDS of over 210,000 mg/L, and hardness of over 43,000 mg/L.

TABLE 3

| Analyte | mg/L |
|---|---|
| Al | 0 |
| B | 17.5 |
| Ba | 0.87 |
| Ca | 13900 |
| Fe | 7.93 |
| K | 639 |
| Mg | 2120 |
| Mn | 0.88 |
| Na | 67700 |
| $SO_4$ | 471 |
| Si | 5.31 |
| Sr | 500 |
| Zn | 0.05 |
| Cl | 133000 |
| $HCO_3$ | 60 |
| OH | 0 |
| $CO_3$ | 0 |

Figure 10:
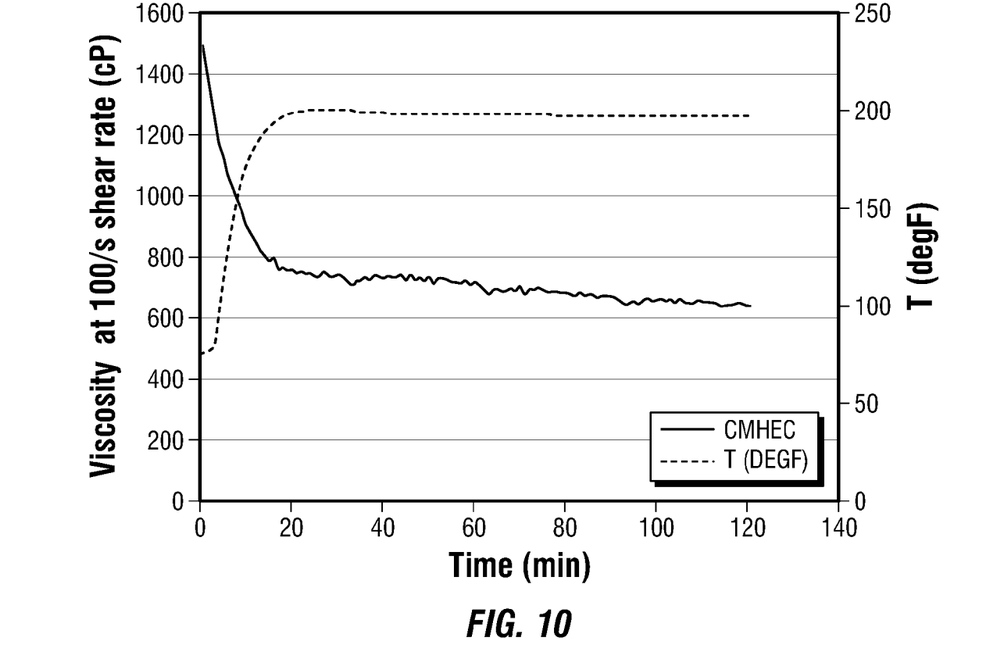

To prepare the fluid, 40 ppt CMHEC powder was hydrated in produced water #2. After the hydration of the polymer, 0.2 gpt pH buffer A and 1 gpt gel stabilizer B were added while blending. 1.4 gpt zirconium crosslinker was then added as the crosslinker. The gel thus formed had a pH of about 4.9 at RT. The viscosity at 200° F. was tested with a Fann50-type viscometer and is shown in FIG. 10. The fluid showed decent viscosity, over 600 cPs (at 100/s shear rate) for at least 2 hours. It is expected that use of CMHEC will be compatible with the methods and compositions described herein that use zirconium salt to increase viscosity.

TABLE 4

| | Produced Water Examples | | | | | | |
|---|---|---|---|---|---|---|---|
| | Ex. 6 | Ex. 6 | Ex. 7 | Ex. 7, 8 | Ex. 8 | Ex. 9 | Ex. 10 |
| pH (RT) | 5.7 | 5.7 | 5.7 | 5.2 | 5.2 | 5.3 | 4.9 |
| HPG | 40 ppt | 50 ppt | 50 ppt | 50 ppt | 50 ppt | 50 ppt | — |
| CMHEC | — | — | — | — | — | — | 40 ppt |
| pH buffer A | — | — | — | — | — | — | 0.2 gpt |
| pH buffer C | — | — | — | yes | yes | yes | — |
| buffer D | 2 ppt | 2 ppt | 2 ppt | — | — | — | — |
| gel stab. A | 6 gpt | 6 gpt | 6 gpt | 6 gpt | 6 gpt | 3 gpt | — |
| gel stab. B | 1.6 gpt | 2 gpt | 2 gpt | 2 gpt | 2 gpt | 2 gpt | 1 gpt |
| Zr x-linker | 1.6 gpt | 2 gpt | 2 gpt | 2 gpt | 2 gpt | 2 gpt | 1.4 gpt |
| $Zr(OH)_4$ | — | — | — | — | 1 wt % | — | — |
| methanol | — | — | — | — | — | 0-7.5 vol % | — |

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

The invention claimed is:

1. A well treatment method comprising:
  forming a well treatment fluid by combining ingredients including an aqueous fluid, a viscosifying agent, a crosslinker, and a rheology modifier containing glyoxal;
  crosslinking the viscosifying agent in the aqueous fluid using the crosslinker, the glyoxal not delaying the crosslinking and the crosslinking increasing viscosity of the well treatment fluid to a first viscosity;
  treating a well with the well treatment fluid exhibiting the first viscosity;
  chemically changing the glyoxal after the crosslinking and thereby forming oxalic acid, the glyoxal not being substantially chemically changed before the crosslinking; and
  after treating the well, decreasing viscosity of the crosslinked well treatment fluid to a second viscosity less than the first viscosity as a result of forming the oxalic acid.

2. The method of claim 1, wherein the viscosifying agent comprises a polymer and the crosslinker comprises a metal cation or borate, the method further comprising breaking a crosslink formed by the metal cation or borate to effect the viscosity decrease.

3. The method of claim 2 wherein decreasing viscosity occurs by a stepwise process including chemically changing the glyoxal, forming the oxalic acid, and the oxalic acid breaking the crosslink formed by the metal cation or borate.

4. The method of claim 1 wherein the viscosity decreases at a faster rate compared to the well treatment fluid without the rheology modifier.

5. The method of claim 1 wherein the aqueous fluid is produced water and the ingredients further include a zirconium salt.

6. The method of claim 5 wherein the zirconium salt is selected from the group consisting of zirconium hydroxide, zirconium dioxide, and combinations thereof.

7. The method of claim 5 wherein the produced water contains more than 100,000 ppm total dissolved solids.

8. The method of claim 7 wherein the zirconium salt comprises zirconium hydroxide.

9. The method of claim 8 wherein the well treatment fluid ingredients contain 0.01 to 20 wt % zirconium hydroxide.

10. The method of claim 7 wherein the well treatment fluid exhibits a pH below 7 at least during the crosslinking.

11. The method of claim 7 wherein the well treatment fluid exhibits a pH between about 6 and about 5 at least during the crosslinking and the treating.

12. A well treatment method comprising:
forming a well treatment fluid by combining ingredients including an aqueous fluid, a viscosifying agent, a crosslinker containing zirconium, and a rheology modifier containing glyoxal;
crosslinking the viscosifying agent in the aqueous fluid using the crosslinker, the glyoxal not delaying the crosslinking and the crosslinking increasing viscosity of the well treatment fluid;
treating a well with the well treatment fluid exhibiting the increased viscosity;
chemically changing the glyoxal after the crosslinking and thereby forming oxalic acid;
the oxalic acid breaking a crosslink formed by the zirconium and decreasing viscosity of the crosslinked well treatment fluid using the oxalic acid.

13. The method of claim 12 wherein the viscosity decreases at a faster rate compared to the well treatment fluid without the rheology modifier.

14. The method of claim 12 wherein the aqueous fluid is produced water and the ingredients further include a zirconium salt selected from the group consisting of zirconium hydroxide, zirconium dioxide, and combinations thereof.

15. A well treatment method comprising:
forming a well treatment fluid by combining ingredients including produced water, a viscosifying agent, a crosslinker containing a metal cation, a rheology modifier containing glyoxal, and a zirconium salt, the produced water containing more than 1,000 ppm total dissolved solids;
dissolving at least a portion of the zirconium salt in the well treatment fluid;
crosslinking the viscosifying agent in the aqueous fluid using the crosslinker and the dissolved zirconium from the zirconium salt, the glyoxal not delaying the crosslinking and the crosslinking increasing viscosity of the well treatment fluid compared to the well treatment fluid without the zirconium salt;
treating a well with the well treatment fluid exhibiting the increased viscosity, acid hydrolysis of the crosslinked viscosifying agent occurring in the well;
stabilizing pH of the well treatment fluid with the zirconium salt during the acid hydrolysis of the viscosifying agent in the well;
chemically changing the glyoxal after the crosslinking and thereby forming oxalic acid;
decreasing pH and chelating the metal cation and the dissolved zirconium with the oxalic acid, thus breaking the crosslinked well treatment fluid and, using the oxalic acid, decreasing viscosity of the crosslinked well treatment fluid compared to the crosslinked well treatment fluid without the rheology modifier.

16. The method of claim 15 wherein the zirconium salt is selected from the group consisting of zirconium hydroxide, zirconium dioxide, and combinations thereof.

* * * * *